United States Patent Office 3,039,877
Patented June 19, 1962

3,039,877
STABILIZED CAROTENE COMPOSITIONS
Benjamin Borenstein, New Brunswick, N.J., assignor to Nopco Chemical Company, Newark, N.J., a corporation of New Jersey
No Drawing. Filed Mar. 2, 1961, Ser. No. 92,780
6 Claims. (Cl. 99—81)

This invention relates to stabilized carotene containing compositions. More particularly, this invention relates to carotene containing compositions which are stable at temperatures of 325° F. and above, and a process for preparing yellow popped corn using said compositions.

The successful use of carotene containing compositions as food coloring additives has heretofore been achieved only when the carotene containing compositions were not subjected to high temperatures. For example, carotene has been used to impart a yellow color to such foodstuffs as margarine, butter, shortenings, egg yolk products, processed cheeses, orange drink bases and concentrates, cream, dry prepared cake mixes, and others. In the coloring of these products, the carotene is not subjected to high temperatures. On the other hand, in the case of high temperature applications, appreciable decomposition of the carotene was found to occur at temperatures from about 325° F. to about 375° F. As a result excess carotene was, of necessity, used with resultant economic disadvantages. At temperatures of 400° F. and above, carotene has heretofore proved useless as a food coloring additive because nearly complete carotene decomposition occurs, and excess amounts of carotene will not cure this defect. Note that even where prepared cake mixes are concerned, the carotene is present primarily to impart a pleasing yellow color to the cake batter which the consumer prepares. In preparing yellow cakes, egg yolks are added to the batter. These egg yolks contribute to the color of the yellow cake. When the cake batter is placed in the oven, temperatures as high as 400° F. are never used and the temperature of the cake while in the oven, never approaches the oven temperature except at the surface of the cake which is generally brown. Even under these favorable conditions, at least a 25% loss of carotene can be accurately anticipated.

Thus it can be seen that carotene is of limited value when it must be exposed to high temperatures. In such instances high temperature stable additives were used, viz., Food Drug and Cosmetic Yellow 3 and Food Drug and Cosmetic Yellow 4. These additives were satisfactory until prohibited by the Food and Drug Administration.

In the preparation of yellow popped corn, by the wet process, carotene has not been used because the majority of commercial corn poppers operate at temperatures of from about 400° F. to about 475° F. and higher. Furthermore, satisfactory yellow coloring additives were used until the use of these specific additives was prohibited by the Food and Drug Administration.

A feasible substitute for "Yellow 3" and "Yellow 4" regarding coloring ability is carotene. However, as indicated previously, carotene decomposes causing loss of its yellow color. In the case of low temperature decomposition the cause is believed to be due to free radical attack on the long chain unsaturated carotene molecule and that this free radical attack causes the carotene molecule to split and form decomposition products such as peroxides which in turn may form aldehydes. These decomposition products impart no color and hence all coloring value of the original carotene is lost.

The mechanism of carotene decomposition at higher temperatures, viz. 325° F. and above, is not known. It is possible that at lower temperatures, carotene decomposes preferentially and at a temperature of 325° F. and above, there is no preferential decomposition. Preferential decomposition means that there are several decomposition reactions or routes possible, and at the lower temperatures, the carotene may decompose along the lines of certain preferred reactions as aforedescribed. However, at the higher temperatures, viz. 325° F. and above, this preference for certain decomposition reactions or routes may be destroyed and the carotene may decompose in a completely unfamiliar or unknown manner.

Regardless of the mechanism of carotene degradation at the higher temperatures, the fact remains that there is no way to predict whether or not carotene will be stabilized at temperatures of 325° F. and above by using any of the known lower temperature anti-oxidants. For example, U.S. Patent 2,711,962, Bickoff, June 28, 1955, in the table in column 4, shows that after lauryl thiodipropionate is added to carotene in forage crops and stored for 14 days at 65° C., 25% of the original carotene is retained at the end of the storage period. On the other hand, in developing this invention, it was found that lauryl thiodipropionate is ineffective for our purposes, in stabilizing carotene at the higher temperatures of 325° F. and above. In addition, two of the stabilizers used in this invention are presented in the same table. These two stabilizers are nordihydroguaiaretic acid and propyl gallate. When these two stabilizers are used by Bickoff under the conditions just described, Bickoff found that they were effective in retaining 24% and 26% respectively of the original carotene present. Clearly, a carotene stabilizer which is at best only 26% effective would be useless in this invention. Note also that Bickoff found propyl gallate more effective than nordihydroguaiaretic acid at the lower temperatures. On the other hand, at the higher temperatures of this invention, it has been found that nordihydroguaiaretic acid is more effective than propyl gallate in stabilizing carotene. Furthermore, it has been found that both propyl gallate and nordihydroguaiaretic acid are effective at the higher temperatures of this invention in retaining more than one half of the original carotene present. The fact that propyl gallate is effective as a carotene stabilizer in this invention at the higher temperatures of this invention viz. 325° F. and above, it all the more surprising, since propyl gallate is known to decompose above 298.4° F. as disclosed in Eastman Chemical Products technical bulletin No. G–109 (1959). Moreover, U.S. Patent No. 2,486,177, Korner, October 25, 1949, states on column 1, lines 46 to 48, that: "N-propyl gallate has been used as a stabilizer for some materials, but has proved useless with carotene." On column 8, lines 33 and 34, Korner, after setting forth his testing of the stability of carotene with several anti-oxidants, states that: "In the same test, n-propyl gallate proved useless yielding the same result as a blank sample." From the foregoing, it is clear that there is no way to predict whether or not carotene will be stabilized at temperatures of 325° F. and above by any known lower temperature antioxidants. Temperature apparently introduces an element of unpredictability in carotene stabilization.

Another factor which appears to make an unpredictable difference in carotene stabilization is the carotene carrier used. For example, the statement is made in "The Journal of the American Oil Chemists' Society," 28,: 68, Bickoff, (February, 1951) that: ". . . (butylated hydroxyanisole), which is a very effective antioxidant for carotene in mineral oil solution, is only slightly effective in alfalfa meal . . . ethyl gallate, which is one of the best antioxidants tested for carotene in mineral oil solution, is completely ineffective for carotene in alfalfa meal under our experimental conditions (9)." And, in "Oil and Soap," 23: 41, Lovern (February, 1946), the statement is made that: "If carotene be dissolved in different solvents and exposed to strong light, the rate of destruction of carotene varies enormously from one solvent to another."

From the foregoing quotations, it is apparent that whether carotene is dissolved in mineral oil, or in another carrier, such as a popping oil, makes an unpredictable difference in the carotene stability. This last statement is supported by and added to by "The Journal of the American Oil Chemists Society," 29: 52, Bickoff et al. (February 1952), which states that: "Pyrogallol was only half as effective in coconut oil as in mineral oil . . ." and further states that: "There exists no easily apparent explanation for the diversity of results in different media. However it may be pointed out that any antioxidant is effective only in a competitive way. Its principal function is to react with one or more of the intermediate products of autoxidation to stop the chain-sustaining reactions and prolong the induction period. The complex media of lard or coconut oil and carotene contain a number of substances which are subject to autoxidation either selectively or concurrently. In addition, the individual stability of these components is affected markedly by the presence of others. Whether an antioxidant will afford the same order of magnitude of protection in different media appears at this time difficult to predict . . . under different conditions an antioxidant may not only lose all activity but may even appear to act as a prooxidant. Finally it should be noted that the solubility of an antioxidant in the media in which its activity is being observed is beyond question an important factor. Thus in a heterogeneous mixture such as alfalfa the antioxidant must be soluble in that phase which it is designed to protect a fact which may account for the complete lack of activity of most of the pyrogallol derivatives towards carotene in alfalfa."

Furthermore, this publication shows, in Table II, that after storing carotene with 6-ethoxy-2,2,4-trimethyl-1,2-dihydroquinoline in alfalfa meal at 65° C. for two weeks, 63% of the original carotene remains. Under the same conditions, using propyl gallate, only 26% of the original carotene remains. In the compositions and process of this invention, propyl gallate has been found effective as a carotene stabilizer while 6-ethoxy-2,2,4-trimethyl-1,2-dihydroquinoline has been found useless as a carotene stabilizer. As stated previously, a stabilizer which is only 26% effective would be useless in this invention.

In "The Journal of the American Oil Chemists' Society," 29; 446, Bickoff et al. (November 1952), Table I shows that after storing carotene with 6-ethoxy-2,2,4-trimethyl-1,2-dihydroquinoline at 75° C. in mineral oil, 80% of the original carotene remains at the end of 140 hours. This article states, on page 446, that: "However several dihydroquinolines were powerful antioxidants (6-ethoxy-2,2,4-trimethyl-1,2-dihydroquinoline)." As stated before, this compound has proven useless in the compositions and process of this invention.

The above quotations further illustrate why it is not possible to predict what will happen with any given stabilizer when it is used in various media.

From a review of the foregoing, when the factors of different media and high temperatures, viz. 325° F. and above, are present at the same time with any given stabilizer, it is clear that the effectiveness of any stabilizer for carotene would be even more impossible to predict than when only one of these factors are present.

U.S. Patent 2,607,746, Magoffin, August 19, 1952, discloses, both alone and in combination with one another, certain compounds which are used in the present invention as carotene stabilizers. However, U.S. Patent No. 2,607,746 discloses the use of these compounds as antioxidants for fats and oils, and not as carotene stabilizers. Furthermore, nowhere in U.S. Patent No. 2,607,746 is temperature mentioned as a factor to be considered except for the statement that the antioxidant containing concentrate is a homogeneous system even at temperatures as low as minus 20° C.

U.S. Patents, 2,777,797 and 2,777,798, both Hochberg et al., and both issued January 15, 1957, also disclose compounds which are used in this invention to stabilize carotene. However, there are several important differences. The two Hochberg et al. patents are concerned with preserving the vitamin A moiety rather than carotene per se. Indeed, it is well known that the carotene molecule may be split without destroying the vitamin A potency and in fact the human body itself, must split the carotene molecule to form vitamin A. On the other hand, it is also well known that the carotene molecule cannot be split and still retain its value as a food colorant. Furthermore, the two Hochberg et al. patents do not utilize temperatures which even approach the minimum temperature of this invention. In addition, the two Hochberg et al. patents use carotene carriers which are foreign to this invention, and as has been shown, all of the above factors render any sort of prediction concerning the effect of different compounds on carotene stabilization at higher temperatures, viz. 325° F. and above, and in different media, completely meaningless.

An object of this invention, therefore, is to provide carotene containing compositions which are color stable at high temperatures, viz. 325° F. and above.

Another object of this invention is to provide a process for preparing yellow popped corn using carotene.

Other objects and advantages will become apparent from the following description and claims.

It has been unexpectedly discovered that the above and other objects can be successfully achieved in the following manner.

Broadly, this invention contemplates color stabilized carotene compositions at temperatures of from about 325° F. to about 550° F., comprising carotene, at least one carrier, and at least one carotene stabilizer selected from the class consisting of butylated hydroxy anisole, butylated hydroxy toluene, propyl gallate, and nordihydroguaiaretic acid, said carotene composition characterized by its stability towards loss of coloring power.

This invention also contemplates a process for preparing yellow popped corn, comprising the steps of heating popcorn at temperatures of from about 325° F. to about 550° F. in the presence of at least one popping oil, carotene, and at least one carotene stabilizer selected from the class consisting of butylated hydroxy anisole, propyl gallate, nordihydroguaiaretic acid and butylated hydroxy toluene.

In the process and compositions of this invention, carotene in any of its various forms can be used. For example, naturally occurring mixtures containing primarily alpha and beta carotene derived from palm oil, carrots, or any other natural source can be used, or synthetic alpha or beta carotene or mixtures thereof can be used. In addition, the entire unsaponifiable material from palm oil can also be used as a carotene source.

The stabilized carotene composition or parts thereof, upon addition to the popping oil, can be in the form of a concentrate in any edible liquid such as propylene glycol, vegetable oils, and the like, or in the form of a suspension in known edible materials or a paste of known edible materials. In addition, crystalline carotene can be used either as a solution, suspension, paste, or as a dry solid. It is not preferred to use crystalline carotene as a dry solid because it is believed that exposure to atmospheric conditions will degrade the carotene, but when carotene is utilized as a paste, solution, or suspension, it is protected from the atmosphere and will not degrade due to atmospheric conditions.

In practicing this invention, the stabilized carotene composition can be dissolved in the popping oil or the individual components of the composition can be added directly to the popping oil. If the stabilized carotene composition is in the form of a concentrated solution, then whatever solvent or solvent mixture is used to dissolve the components must be sufficiently polar to dissolve them and must be sufficiently soluble in the popping oil or oils used to assure that the stabilizer or stabilizers and a metal chelator, if used, will dissolve in the popping oil or oils used. When the propyl gallate or citric acid is used, a solvent for these materials must be present, such as propylene glycol. If desired, I may use palm oil, which contains carotene, and merely add thereto the stabilizers described herein in order to prepare the stabilized compositions. All of the solutions referred to above may contain some undissolved carotene particles, however, the small amount of carotene which is undissolved is not critical. Carotene can be present in the popping oil in an amount of from about 0.007% to about 0.02% based upon the weight of the popping oil. Amounts of carotene which are below 0.007% are ineffective as colorants in this invention. If an amount of carotene in excess of 0.02% is used, the popped corn may have undesirable odors.

The carotene stabilizer should comprise, whether one or a mixture of stabilizers is used, from about 0.005% to about 0.03% of stabilizer based on the weight of the popping oil incorporated therewith or to be used. If the carotene stabilizer or stabilizers are present in amounts less than about 0.005%, then such stabilizer or stabilizers will be ineffective in preparing a commercially acceptable yellow popped corn, although amounts as low as 0.001% are somewhat effective in stabilizing carotene. If the stabilizer or stabilizers are present in amounts exceeding about 0.03% based on the weight of the popping oil, these higher levels may produce undesirable odors in the popped corn.

The carotene stabilizers which can be used in the compositions and process of this invention are butylated hydroxy anisole, n-propyl gallate, nordihydroguaiaretic acid, and butylated hydroxy toluene. These stabilizers can be used in any combination with one another so that any amount of one stabilizer can be used with any amount of one or more of the other aforesaid stabilizers, as long as the quantity of the carotene stabilizer composition is between about 0.005% and 0.03% based on the total weight of oil incorporated therewith or to be incorporated therewith.

If desired, a metal chelator such as citric acid or another suitable material may be incorporated into the carotene-containing stabilizer composition. It is known that heavy metals such as iron act as pro-oxidants towards carotene. These heavy metals may be present in the equipment used to prepare popped corn, as rust or in some other manner. The use of citric acid as a metal chelator is known in the art and need not be discussed further.

Among the popping oils which can be used in the composition and process of this invention are coconut oil, peanut oil, palm oil and the like.

Popped corn can be prepared by either the wet or dry process. With the compositions and process of this invention, only the wet process is contemplated. In the wet process of preparing yellow popped corn according to this invention, the oil, popcorn, carotene, and stabilizer or stabilizers according to the compositions of this invention are placed in any one of the known apparatuses for preparing popped corn by this method. The entire mixture is then heated to a temperature between about 325° F. to about 550° F. The kernels of popcorn then explode to give the finished yellow popped corn. Salt and flavorings such as butter flavoring, caramel, and the like, can be added to the popped corn, if desired.

The fluffy white irregular mass which is the kernel of popped corn represents the expanded endosperm of the original grain. The apparent volume of the kernel increases thirty or more times when it undergoes popping. The popping of corn is related to a sudden expansion of moisture in the intercellular spaces of the endosperm. A possible explanation for the popping of corn may be that the very tough, thick, and continuous bran coat of the popcorn kernel retains the steam until pressures in the kernel of popcorn are built up, at which time it ruptures, suddenly releasing the endosperm with its contents of superheated water vapor. However, the above theory is not to be considered as binding and should not be construed as limiting the scope of this invention.

The corn which can be used to prepare popped corn is the type of corn known as popcorn. There are many varieties of popcorn which can be used to prepare popped corn. Among the varieties of popcorn which can be used are Japanese Hulless, South American, White Rice, Tom Thumb, Yellow Pearl, etc.

In order to more fully illustrate the nature of this invention and the manner of practicing the same, the following examples are presented.

In the examples which follow, reference is made to the term absorbance. The term, as used herein, is the negative logarithm to base 10 of the ratio of transmittance of the sample to that of the reference or standard material. Other names that have been used for the quantity represented by this term are optical density, extinction, and absorbancy.

EXAMPLE I

The purpose of this example is to illustrate the enhanced stability of carotene at high temperatures, using the compositions of this invention. The carotene used in this example was derived from palm oil and dissolved in coconut oil.

The following general procedure was used in determining the stability of each of the carotene containing compositions both before heating and after heating at temperatures of from 325° F. and above. The carotene and stabilizer were dissolved in 40 cc. of coconut oil and the solution was divided into two 20 cc. portions. One 20 cc. portion was placed in a test tube. The other 20 cc. portion was set aside and not heated in order to compare the absorbance of the unheated solutions with the absorbance of the corresponding heated solution. The sample was immersed in an oil bath maintained at a temperature of 455° F. and was agitated continuously for 180 seconds. The tube was then removed from the bath and aircooled. One cc. samples were then taken from the solutions, both heated and unheated, and added to 15 cc. portions of chloroform.

The stability of the stabilized carotene solution was determined by measuring the absorbance of the solution, before and after heating, at the wave length of maximum absorbance of carotene. The wave length of maximum absorbance of carotene is 460 millimicrons, and all absorbances of the sample solutions were measured by placing the samples in 12 millimeter diameter optically matched tubes using a Coleman Junior Spectrophotometer to read the absorbance. The absorbance after heating divided by the absorbance before heating multiplied by 100, is called "Percent Color Retained." It is well known that absorbance is directly related to concentration. Thus, a reading of half the absorbance after heating as compared to before heating would mean that one-half of the carotene had been destroyed.

In the following table, the amounts of the various materials used are expressed in percents based upon the weight of the oil carrier used. In this example 0.00292% of citric acid, based upon the weight of the oil used, was added to each carotene containing stabilizer composition. The amount of carotene used was 0.0140% by weight, based upon the weight of popping oil used. Where a control is used, no citric acid was added thereto. The following table presents the results obtained:

*Table I*

[Heat stability of 0.0140% of carotene derived from palm oil dissolved in coconut oil]

| Percent by Weight of Stabilizer Used | Absorbance | | Percent Color Retained |
|---|---|---|---|
| | Before Heating | After Heating | |
| None | 1.38 | 0.595 | 43 |
| 0.0140 butylated hydroxy anisole and 0.0035 n-propyl gallate | 1.38 | 0.82 | 59.5 |
| 0.020 nordihydroguaiaretic acid | 1.38 | 0.86 | 62.3 |
| 0.01225 n-propyl gallate | 1.30 | 0.69 | 53.1 |
| 0.0175 butylated hydroxy anisole | 1.38 | 0.75 | 56.5 |
| 0.0200 butylated hydroxy toluene | 1.38 | 0.70 | 51 |
| 0.010 butylated hydroxy anisole and 0.010 butylated hydroxy toluene | 1.38 | 0.745 | 54 |
| 0.0070 butylated hydroxy toluene and 0.0070 butylated hydroxy anisole and 0.0035 n-propyl gallate | 1.38 | 0.73 | 53 |
| None | 1.25 | 0.505 | 40.4 |
| 0.001 nordihydroguaiaretic acid | 1.25 | 0.535 | 42.8 |
| 0.004 nordihydorguaiaretic acid | 1.25 | 0.600 | 48.0 |

*Table II*

[Heat stability of 0.0140% by weight of synthetic β-carotene dissolved in coconut oil]

| Percent by Weight of Stabilizer Used | Absorbance | | Percent Color Retained |
|---|---|---|---|
| | Before Heating | After Heating | |
| None | 1.30 | 0.49 | 37.7 |
| 0.00875 butylated hydroxy anisole and 0.0035 n-propyl gallate | 1.30 | 0.675 | 52.0 |
| 0.014 butylated hydroxy anisole and 0.0035 n-propyl gallate | 1.30 | 0.70 | 53.8 |

As the above data illustrate, a carotene composition according to this invention is more stable at higher temperatures when compared with a carotene composition which does not contain the stabilizers used in this invenition. This enhanced stability of the carotene enables one to utilize the carotene compositions of this invention whenever high temperatures, i.e., 325° F. through 550° F., are called for, and in particular, such as stable carotene composition is commercially successful in preparing yellow popped corn according to the process of this invention. In addition to the percentages of stabilizer compositions used in the foregoing table, a carotene stabilizer composition in the amount of 0.03% by weight based upon the weight of the oil used has been found to stabilize carotene when compared to a composition which contained the same amount of carotene but did not contain any stabilizer composition according to this invention.

EXAMPLE II

The purpose of this example is to illustrate the manner of preparing popped corn according to the process of this invention using the stabilized carotene compositions of this invention in a popping oil.

A popping oil was first prepared as follows.

The following composition was prepared by simple mixing:

|   | Grams |
|---|---|
| 20% carotene (derived from palm oil) by weight of, and partially dissolved in, the unsaponifiable portion of palm oil | 240 |
| Butylated hydroxy anisole | 30 |
| n-Propyl gallate | 12 |
| Citric acid | 10 |
| Propylene glycol | 28 |
| Total | 320 |

0.3 gram of the above composition was then added to 300 grams of coconut oil thus forming a popping oil composition.

20 grams of this popping oil were placed in an electric popper which had been pre-heated to a temperature of 450° F. 65 grams of popcorn were then added to the popper. The corn was completely popped within seventy seconds. At the end of the popping cycle, the temperature was 510° F. The popped corn upon visual examination had an attractive butter like yellow color.

EXAMPLE III

The purpose of this example is to illustrate the use of the stabilized carotene compositions at a temperature of from 350° F. to 400° F. A popping oil composition was first prepared as follows.

The following composition was prepared by simple mixing:

|   | Grams |
|---|---|
| 20% carotene (derived from palm oil) by weight of, and partially dissolved in, the unsaponifiable portion of palm oil | 60 |
| n-Propyl gallate | 3 |
| Butylated hydroxy anisole | 12 |
| 24.5% citric acid by weight dissolved in propylene glycol | 10.4 |
| Total | 85.4 |

42.8 mg. of the above composition was added to 39.7 grams of coconut oil thus forming a popping oil composition. The popping oil composition was then placed in an electric popper and the temperature of the popping oil was raised to 350° F., within six minutes. When the temperature reached 350° F., 65.7 grams of popcorn was added to the oil. After an additional four minutes, the corn was completely popped. The temperature at the conclusion of the popping cycle was 400° F. The popped corn had an extremely attractive butter like yellow color.

The process of this invention is a simple one and may be carried out by an operator without any special skill or training. In addition, the compositions used in this invention are effective in stabilizing carotene at temperatures of from about 325° F. to about 550° F. Using the compositions of this invention, yellow popped corn can be easily and inexpensively prepared.

While this invention has been described in terms of certain preferred embodiments and illustrated by means of specific examples, these are illustrative only, and the invention is not to be construed as limited, except as set forth in the following claims.

Having described my invention what I claim as new and desire to secure by Letters Patent is:

1. A process for preparing yellow popped corn comprising the steps of heating popcorn at temperatures of about 400° F. to about 550° F. in the presence of at least one popping oil, carotene, and at least one carotene stabilizer selected from the class consisting of butylated hydroxy anisole, n-propyl gallate, nordihydroguaiaretic acid and butylated hydroxy toluene, said carotene being present in amounts of from about 0.007% to about 0.02% based upon the weight of said popping oil present, said carotene stabilizer being present in amounts of from about 0.005% to about 0.03% based upon the weight of said popping oil present.

2. A process according to claim 1 wherein said oil is peanut oil.

3. A process according to claim 1 wherein said stabilizer consists essentially of butylated hydroxy anisole and n-propyl gallate.

4. A process according to claim 3 wherein citric acid is present.

5. A process according to claim 1 wherein a metal chelator is present.

6. A process according to claim 1 wherein said stabilizer is nordihydroguaiaretic acid.

References Cited in the file of this patent

UNITED STATES PATENTS

| | | |
|---|---|---|
| 2,648,610 | Martin | Aug. 11, 1953 |
| 2,777,797 | Hochberg | Jan. 15, 1957 |
| 2,861,891 | Bauernfeind et al. | Nov. 25, 1958 |
| 2,916,385 | Bauernfeind | Dec. 8, 1959 |

UNITED STATES PATENT OFFICE
CERTIFICATE OF CORRECTION

Patent No. 3,039,877                                          June 19, 1962

Benjamin Borenstein

It is hereby certified that error appears in the above numbered patent requiring correction and that the said Letters Patent should read as corrected below.

Column 2, line 47, for "it" read -- is --; column 7, line 47, for "as" read -- a --.

Signed and sealed this 8th day of January 1963.

SEAL)
Attest:

ERNEST W. SWIDER
Attesting Officer

DAVID L. LADD
Commissioner of Patents